April 3, 1962 E. Y. SEBORG 3,027,813
RAIL LEVELING SYSTEM
Filed Aug. 1, 1958 4 Sheets-Sheet 3
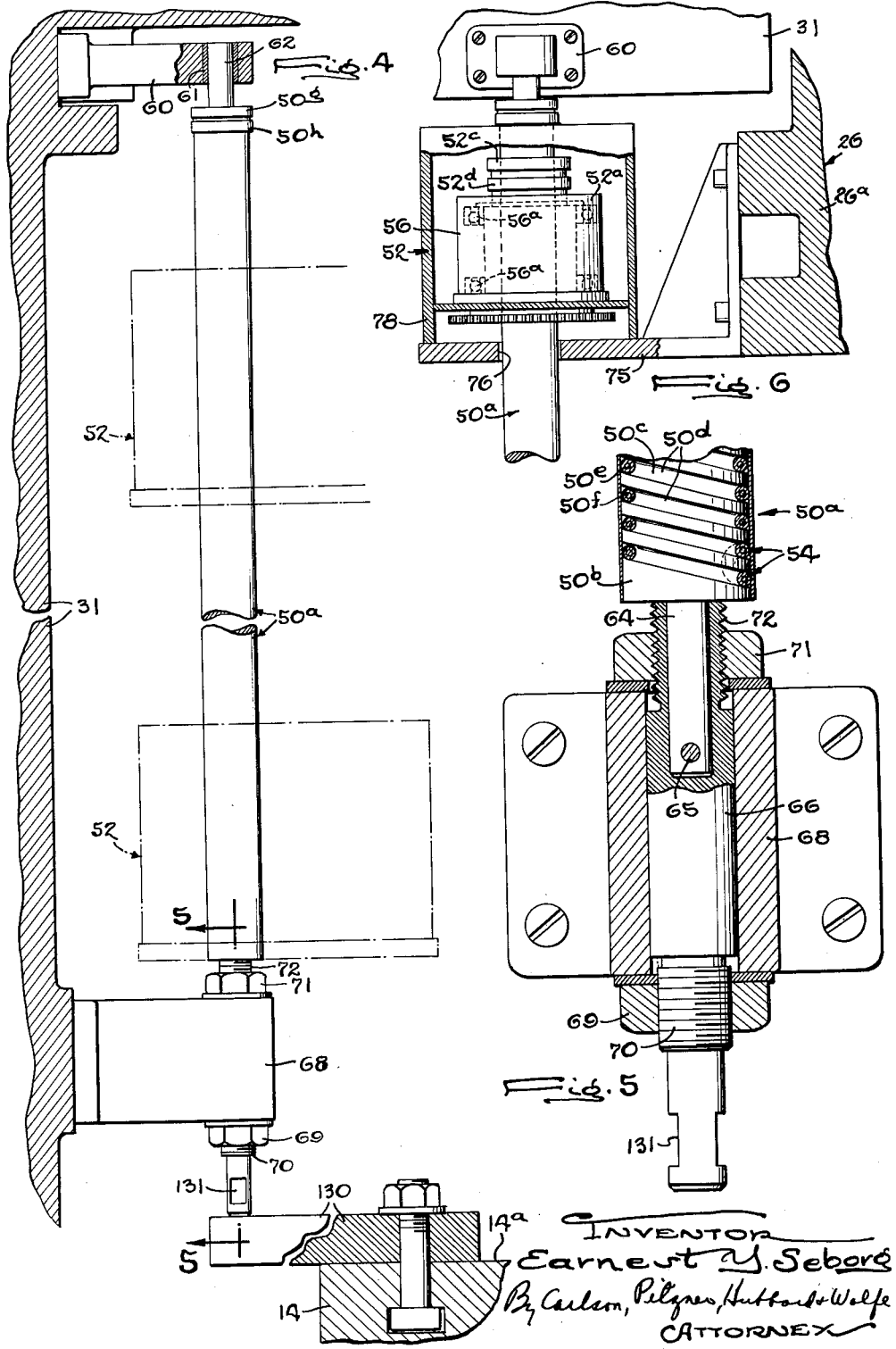

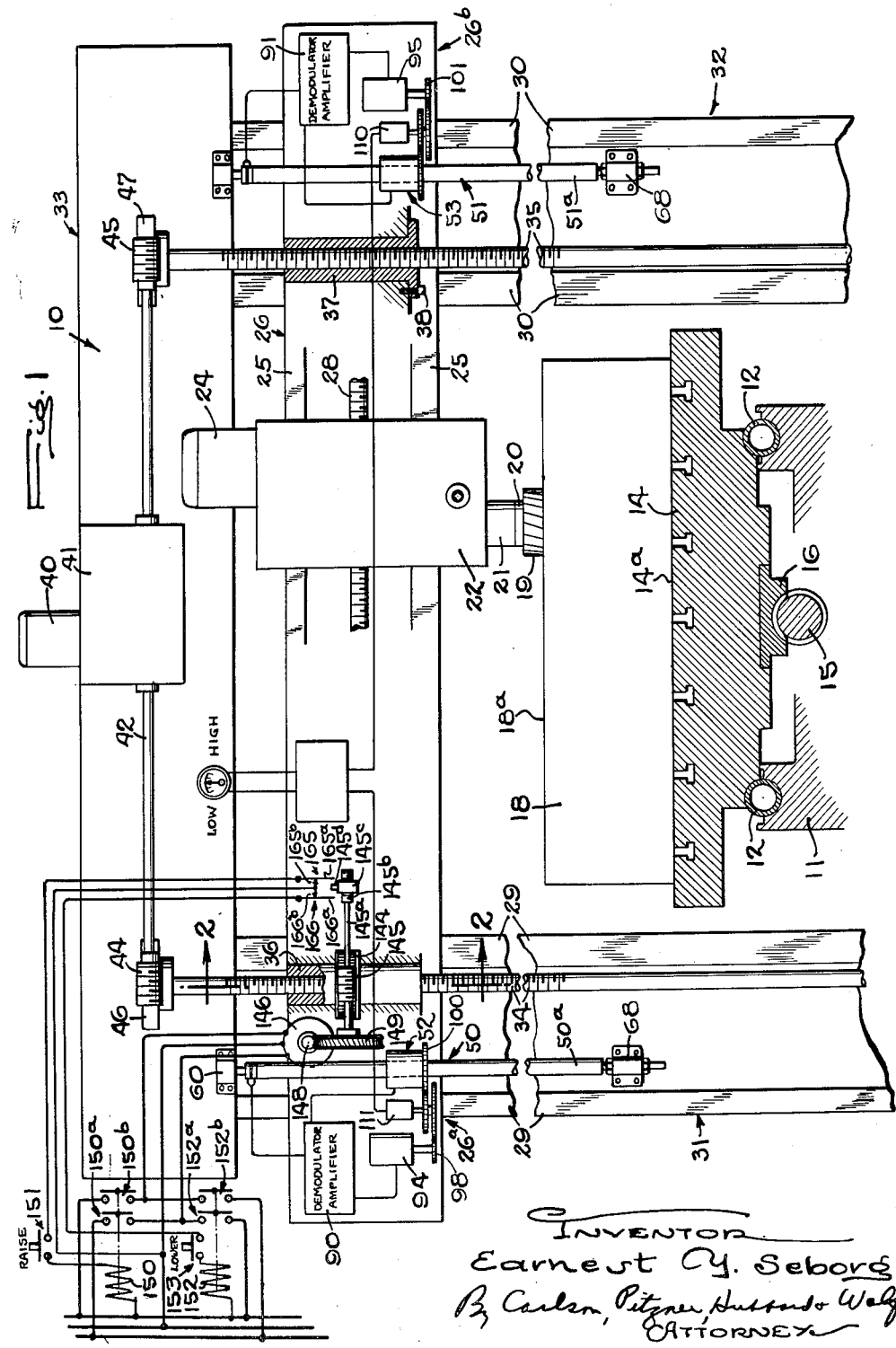

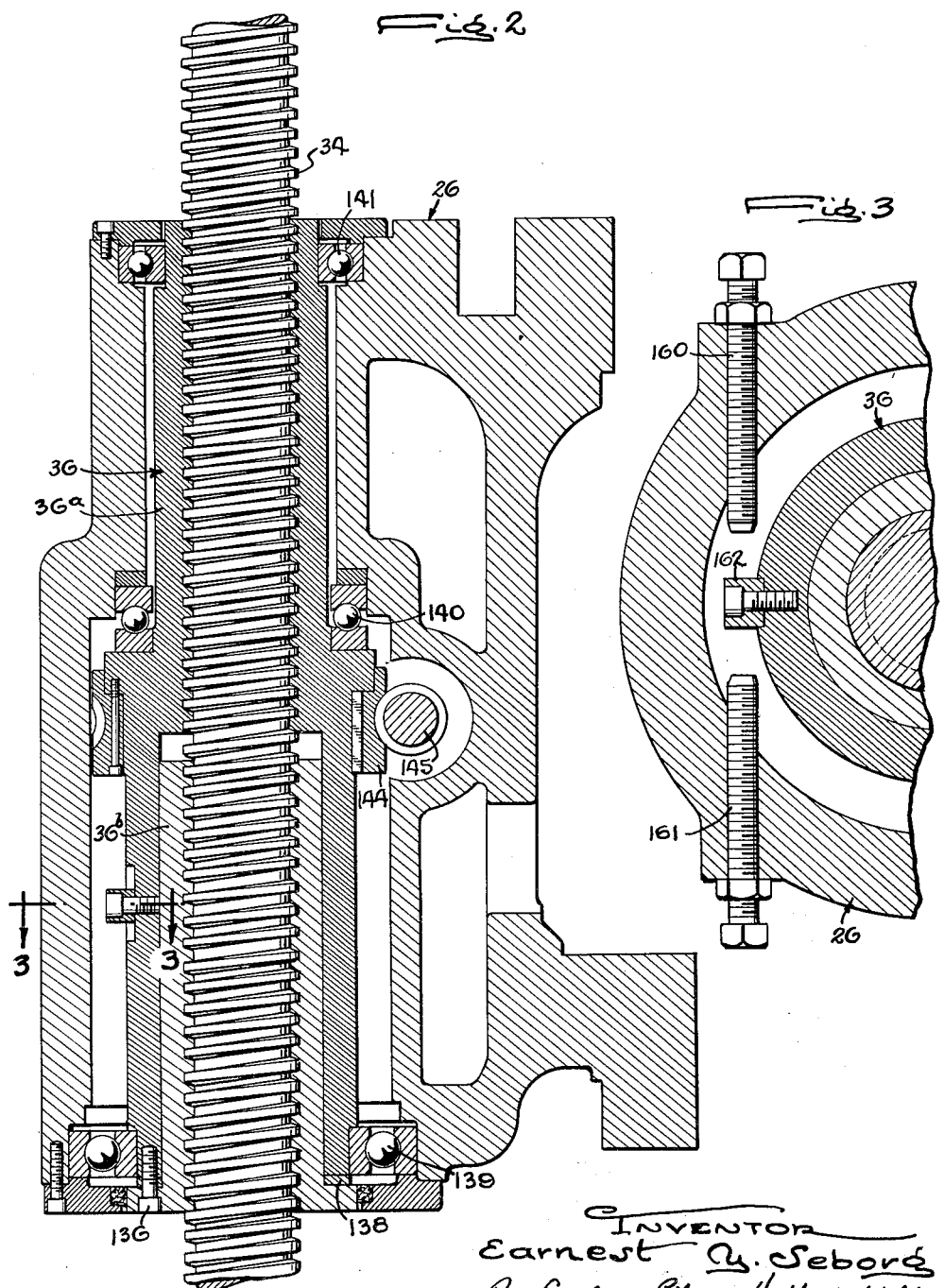

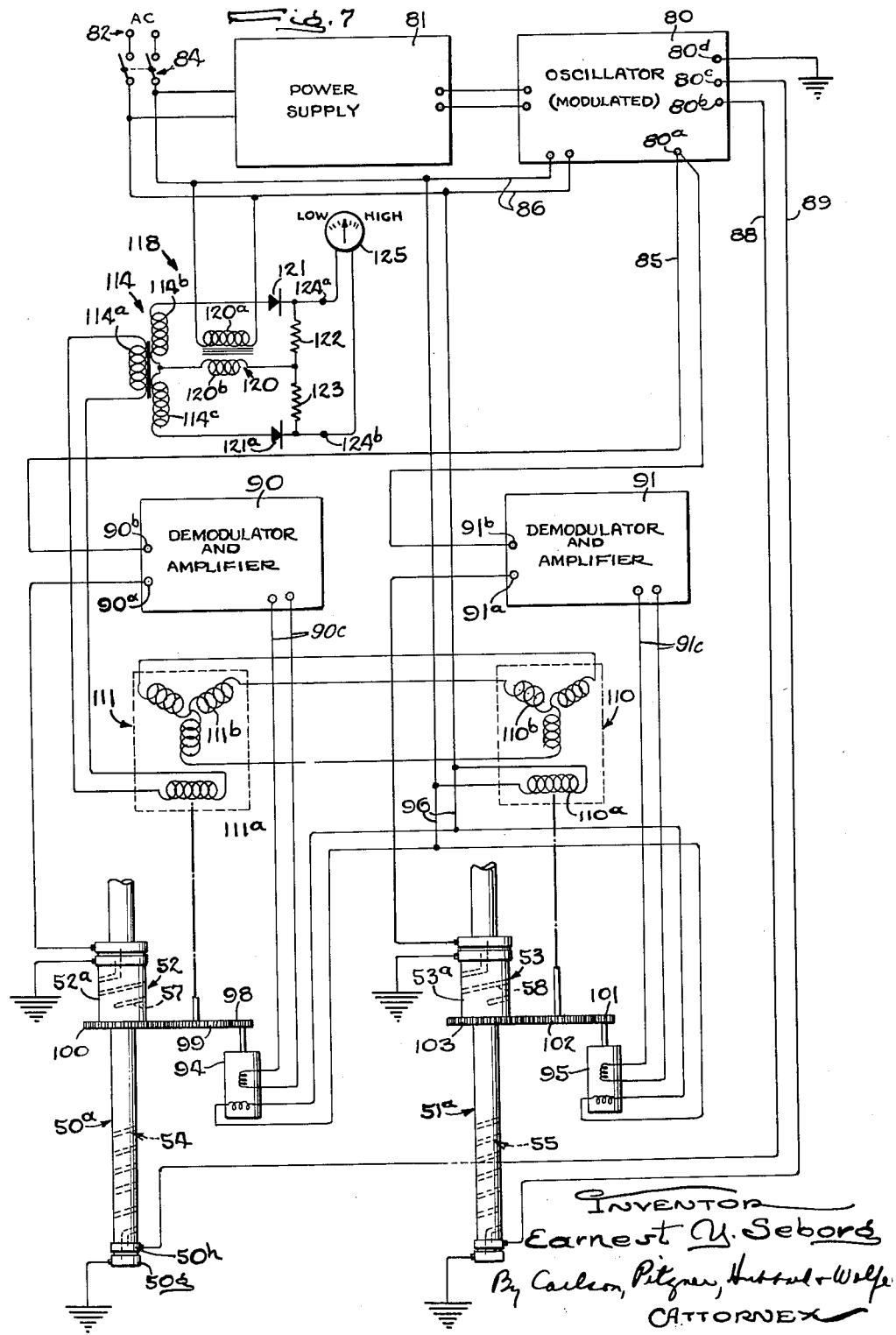

United States Patent Office 3,027,813
Patented Apr. 3, 1962

3,027,813
RAIL LEVELING SYSTEM
Earnest Y. Seborg, Rockford, Ill., assignor to The Ingersoll Milling Machine Company, Rockford, Ill., a corporation of Illinois
Filed Aug. 1, 1958, Ser. No. 752,593
6 Claims. (Cl. 90—15)

The present invention relates in general to precision posturing of elongated members movable vertically by two or more elevating means engaged at spaced points therealong. More particularly, the invention has to do with precise leveling or alinement of the cross rail of a milling machine or the like with the surface of a work support or table.

It is the general aim of the invention to make it possible to quickly and accurately bring an elongated member, which is vertically movable by two spaced elevating means normally actuated in unison, into precise alinement with a substantially horizontal datum plane, thereby correcting for thermally induced distortions, loading strains, or wear of parts which may from time to time cause the elongated member to be slightly cocked or tilted relative to the datum plane.

Another object of the invention is to improve the precision of operation of machine tools, such as milling machines, which have vertically movable cross rails for supporting headstocks. In this connection, it is a more specific object to provide a novel system for signaling when a rail is not parallel to the surface of a work support or table, and for conveniently returning the rail to substantially perfect parallelism with such surface.

A further object of the invention is to provide a system for precisely leveling the rail of a machine tool without the necessity for an operator to physically measure distances or angles. On the contrary, the system according to one form of the invention makes it possible for the operator to simply observe a dial and correctively energize a motor until the dial indicates that the rail is precisely leveled.

Other objects and advantages will become apparent as the following description proceeds, taken in conjunction with the accompanying drawings, in which:

FIGURE 1 is a fragmentary elevation, partly in section of an exemplary machine tool to which the system of the present invention has been applied, certain components of such system being illustrated in diagrammatic form.

FIG. 2 is a sectional view taken substantially along the line 2—2 in FIG. 1 and illustrating a mechanism for selectively actuating one of two rail elevating means;

FIG. 3 is a fragmentary section taken substantially along the line 3—3 in FIG. 2 and showing a mechanical limit imposed on the elevating means of FIG. 2;

FIG. 4 is a fragmentary view illustrating the mounting of a distance-sensing transducer and means for adjusting the same;

FIG. 5 is a fragmentary section taken substantially along the line 5—5 in FIG. 4 and showing the adjustment means in greater detail;

FIG. 6 is a fragmentary elevation, partially in section, showing details of the transducer mounting; and FIG. 7 is a diagrammatic illustration, partially in block and line form, of the electrical components utilized in the present system.

While the invention has been shown and is described in some detail with reference to a particular embodiment thereof, there is no intention that it thus be limited to such detail. On the contrary, it is intended here to cover all modifications, alternative constructions, and equivalents falling within the spirit and scope of the invention as defined by the appended claims.

Referring now to the drawings, a preferred, exemplary embodiment of the invention has been illustrated as applied to a machine tool, specifically a milling machine 10 partially shown in FIG. 1. To make clear the environment of and the problems solved by the invention, it is noted that the milling machine includes a bed 11 having tubular ways 12 which receive a work support or table 14. The table 14 has freedom to slide longitudinally back and forth along the ways 12, and may be so driven by means of a screw 15 journaled on the bed and cooperatively engaged with a nut member 16 attached to the underside of the table. The table 14 has an upper surface 14a which is substantially flat and which supports a workpiece 18.

Milling of the workpiece 18 is accomplished by a cutting tool 19 carried by a rotatable spindle 20 journaled in a quill 21 which can be positioned vertically relative to a headstock 22. The headstock includes a motor 24 drivingly connected through speed change gearing (not shown) to the spindle to rotate the cutting tool 20 at any selected one of a plurality of speeds.

To enable the cutter 19 to be moved transversely across the workpiece 18, the headstock 22 is slidably supported on ways 25 of an elongated member or rail 26. A horizontal lead screw 28 is journaled on the rail and engaged with a nut (not shown) in the headstock. Rotational drive of the lead screw 28 (by means not shown) traverses or feeds the headstock 22 back and forth along the rail 26.

Because the quill 21 has a limited range of vertical adjustment, the headstock 22 may be bodily raised or lowered to locate the cutter 19 at various levels relative to the table 14. For this purpose, the rail 26 is slidably engaged at its opposite end portions 26a, 26b with way surfaces 29 and 30 formed respectively on two upright columns 31 and 32 which are bridged at their upper end by a cross piece 33. These columns are spaced apart and located on either side of the work table 14. To raise and lower the rail 26, two elevating means are engaged at spaced points near the opposite ends of the rail, and are arranged to normally operate in unison. As here shown, such elevating means comprise screws 34 and 35 vertically disposed along and rotatably supported by the columns 31 and 32. Cooperatively threaded nuts 36 and 37 are carried by the rail 26 and engaged with the screws 34 and 35. The nut 36 is normally locked against rotation relative to the rail, as will be more fully explained below. The nut 37 is always locked against rotation relative to the rail by fastening screws 38 or the like.

To operate the two elevating means in unison, so that the opposite end portions of the rail 26 are raised and lowered by equal amounts, an elevating motor 40 is drivingly connected through a gear box 41 to a shaft 42 which carries worm gears 44 and 45 on its opposite ends. These latter worm gears are respectively engaged with the worm wheels 46 and 47 fixed to the upper ends of the screws 34 and 35. Thus, when the motor 40 is energized to drive the shaft 42 in one direction or the other, the two elevating screws 34 and 35 will be rotated in the same directions and through the same angles, so that the opposite end portions 26a and 26b of the rail will be raised or lowered through substantially equal distances.

In the operation of a milling machine of the type described, it is often desirable to machine the upper surface 18a of the workpiece 18 such that it is perfectly planar and parallel to the underside of the workpiece which rests on the table surface 14a. It has been found that, even though the elevating screws 34, 35 and nuts 36, 37 are of precision construction, the rail 26 will inevitably become very slightly cocked or titled relative to the datum plane which is defined by the surface 14a of the table 14. For example, one of the columns might be placed at a higher temperature than the other, thus causing thermal distortions which tend to make one end of the rail 26 higher than the other with reference to the datum plane or surface 14a. Also, if the elevating nuts and lead screws should become worn unequally, it is possible that when the rail is moved to a given vertical location one end portion thereof might be higher than the other. Unequal loading of the screws, when the headstock 22 is at one limit or the other of its travel along the rail may also make the latter very slightly skewed relative to the table surface 14a.

Such departures of the rail are indeed small, involving errors on the order of .002 inch to .010 inch. Yet, if machining is carried out while the rail 26 is thus not truly parallel with the table surface 14a, the cutting tool 19 will change in its elevation relative to the table surface as the headstock 22 is moved back and forth along the rail. This can result in the upper surface 18a of the workpiece being machined such that it is not a planar surface precisely parallel with the lower surface of the workpiece. And with present day demand for finer tolerances on finished workpieces, such lack of parallelism is objectionable.

It is to the elimination of the foregoing difficulty that the present invention is directed, making it possible for an operator of a machine tool to be continuously assured that the rail 26 is precisely parallel to the table surface 14a.

In carrying out the invention, means are provided to electrically sense the distance of each end portion 26a, 26b of the rail 26 from the datum plane or surface 14a. For this purpose, two two-part transducers 50 and 51 are utilized, the first being arranged to produce an electric signal indicative of the distance of the end portion 26a from the datum plane, and the second being arranged to produce an electric signal indicative of the distance of the portion 26b from the datum plane. As shown in this instance, the transducers 50 and 51 are both of a type known in the art and marketed by the Canadian Westinghouse Company Limited of Hamilton, Ontario, under the trade name "Nultrax." The transducers each include an identical stator 50a, 51a which, as shown in FIG. 5, is formed by a steel rod 50b having double track helical grooves 50c and 50d precisely machined in the surface thereof to correspond generally to screw threads. The helical grooves 50c and 50d are formed with a pitch on the order of 0.20 inch. Wound in the two grooves are two insulated conductors or wires 50e and 50f, such wires being connected together at the upper ends of the rod to form a single bifilar primary coil 54 having its extremities brought out and connected to terminals 50g and 50h (FIG. 7). The stator 51a similarly has a primary coil 55 brought out to connecting terminals.

Associated with the stators 50a and 51a are closely spaced but relatively movable parts or armatures 52 and 53. Since the two armatures are substantially identical and mounted in the same way, it will suffice to describe only the armature 52 which, as seen in FIG. 6, includes a hollow cylindrical body 52a surrounding and movable relative to the stator rod 50a. The inner surface of the cylindrical body 52a is formed with dual helical grooves which receive two conductors having their extremities at one end of the cylinder connected directly together. The opposite extremities are brought out to terminals 52c and 52d made in the form of slip rings, so that the two conductors together constitute a bifilar secondary coil 57 (FIG. 7). The armature 53, identically constructed, has a secondary coil 58. The pitch of the internal grooves within the cylinder 52a is made identical to the pitch of the grooves 50c and 50d in the associated stator rod 50b.

For a purpose to be made clear below, the armature cylinder 52a is journaled by bearings 56a within a housing 56. This makes it possible for the armature cylinder 52a to be rotated, as well as moved longitudinally, relative to the associated stator rod.

The stators 50a and 51a are mounted rigidly on the respective columns 31 and 32 (FIG. 1) but with freedom for initial vertical and angular adjustment. For this purpose, an upper bracket 60 is fixed in extending relation to the column 31, having a bushing 61 which slidably receives a rod 62 projecting upwardly from the stator 50a. The lower end of the stator 50a has a rod 64 which is inserted into and held by a pin 65 within an adjusting plug 66. The plug 66 is adjustable within a lower bracket 68 extending from the lower portion of the column 31 (FIG. 4), and locked in place by nuts 69 and 71 engaged with threads 70 and 72.

The armature cylinders 52 and 53 of the transducers 50 and 51 are mounted on the opposite end portions 26a and 26b of the rail 26, and in surrounding, relatively movable relationship to the stators 50a and 51a. As shown in FIG. 6, a bracket 75 is bolted to and extends forwardly from the rail 26, having an opening 76 through which the stator 50a freely extends. The bracket carries an outer casing 78 surrounding the housing 56 which journals the armature cylinder 52a. The housing 56 is rigidly mounted within the casing 78, so that the armature cylinder 52a moves up and down along the stator 50a as the rail portion 26a moves up and down relative to the column 31.

Because the primary coil carried on each transducer stator and the secondary coil carried by each transducer armature are closely spaced and inductively coupled, if the primary coil is excited with an A.C. signal, an A.C. output voltage will be induced in the secondary coil which is of an amplitude and phase related to the relative longitudinal and angular positions of the stator and armature. Since these transducers are known in the art, it will not be necessary to explain the theory of operation in detail. It is sufficient to note that when corresponding conductors of the secondary and primary windings are alined, the inductive coupling between the two coils will be at a maximum, so that the signals induced in the secondary winding will have a maximum amplitude. Then, if the armature is moved longitudinally relative to the stator until opposite conductors of the two coils are alined, no voltage will be induced in the secondary coil due to a bucking action within the two halves of that coil. As the stator and armature are moved relatively in a longitudinal direction through a distance equal to the pitch of the helical grooves therein, the amplitude of the output signal induced in the secondary winding will vary as a sinusoidal function of displacement. There will be one point within each unit distance equal to the groove pitch at which the output signal has a zero or null value. Moreover, the phase of the output signal induced in the secondary winding relative to the phase of the excitation signal supplied to the primary winding will change by 180° as the output signal shifts from one side of a null point to the other. The output signal thus has a recurring, cyclical amplitude variation as the armature is moved through relatively great distances relative to the stator. However, the signal which is induced in the secondary winding will always reflect by its amplitude and its phase the amount and direction which the armature is displaced from the nearest null location relative to the stator.

It should also be recognized that if the armature is rotated relative to the stator, the relative positions of the primary and secondary conductors will be changed just as if there were relative longitudinal movement. Thus, it is possible to bring the output signal induced in the secondary coil to a null value simply by rotating the armature, and the amount of such rotation will reflect or indicate the previous longitudinal distance or displacement of the armature from a null point along the stator.

Referring now to FIG. 7, the two stator coils 54 and 55 are both excited with an A.C. signal produced by a suitable source, here shown as an oscillator 80. The oscillator receives a direct current operating voltage from a power supply 81 which is connected through an on-off switch 84 to a 60 cycle A.C. voltage source represented by the terminals 82. The oscillator 80 may take any of a variety of well known forms. It will be sufficient to note that a relatively high frequency signal, e.g., 50 kc. appears on an output terminal 80a connected to a conductor 85. Also, the oscillator receives a 60 cycle A.C. input from the source 82 over conductors 86, and this 60 cycle signal is used to modulate a 50 kc. signal which appears on the output terminals 80b, 80c connected with conductors 88 and 89. The oscillator 80 also has one terminal 80d connected to a point of reference potential here indicated as ground.

The frequency of the oscillator is not critical, and is chosen to be relatively high in order to enhance the inductive coupling between the primary and secondary coils of the transducers.

The conductors 88 and 89 lead to one terminal of the stator coils 54 and 55, while the opposite terminals of those coils are connected to ground. Thus, the stator coils 54 and 55 are continuously excited with a 50 kc. A.C. wave which is modulated with a 60 cycle signal received from the voltage source 82.

Further in accordance with the invention, provision is made to compare the electrically sensed distance signals induced in the secondary coils 57 and 58, thereby to compare the distances of the two rail end portions from a reference plane. As shown in FIG. 7, the output signals induced in the two secondary coils 57 and 58 are fed to input terminals 90a and 91a of demodulator-amplifiers 90 and 91. Also received on terminals 90b and 91b from the conductor 85 is the 50 kc. reference signal appearing on the output terminal 80a of the oscillator 80. The demodulator-amplifiers 90 and 91 are identical, and may take a variety of well known forms known to those skilled in the art. Briefly stated, these demodulator-amplifiers accept the transducer output signals on the terminals 90a and 91a, together with the 50 kc. reference signal supplied to the terminals 90b, 91b and function to produce on the output lines 90c, 91c a demodulated 60 cycle signal which is proportional in amplitude to the amplitude of the transducer secondary signals and either in phase or out of phase with the A.C. voltage of the source 82, depending upon whether the transducer armatures are displaced in one direction or another from the nearest null position along their corresponding stators. If the two armatures 52 and 53 occupy null positions relative to their associated stators, then the output signals appearing between the lines 90c and the lines 91c will be reduced to zero amplitude.

The output signals from the two demodulator-amplifiers 90 and 91 are supplied respectively to one of the field windings in two-phase A.C. servomotors 94 and 95. The other field winding within the servomotors 94 and 95 receives the reference A.C. signal from the source 82 over conductors 96. It will be apparent, therefore, that the servomotors 94 and 95 will be energized to rotate in one direction or the other depending upon the phase polarity of the output signals on the lines 90c and 91c, and at a speed which is substantially proportional to the amplitude of those two output signals.

In order to drive the transducer armatures 52 and 53 to angular null positions, the two servomotors 94 and 95 are connected through respective gearing 98, 99, 100 and 101, 102, 103 to the rotatable cylinders 52a and 53a. Thus, complete servo loops are established which tend always to rotationally position the transducer armatures 52 and 53 such that they reside in a null position relative to their associated stators 50a and 51a, and such that the signals induced in the secondary coils 57 and 58 are reduced to zero. That is, if an output signal is induced in the secondary winding of the armature 52a, then it will be demodulated and amplified in the amplifier 90, producing an output signal on the lines 90c which is proportional in amplitude to the angular displacement of the armature 52 from the nearest null position, and agreeable in phase with the sense of such displacement from such null position. Therefore, the servomotor 94 will be energized to drive the armature 52 through the gearing 98—100 until the armature 52 is returned to a null position, at which the output signal of the secondary coil 57 and the input signal to the control field winding of the motor 94 are both reduced to zero. The same mode of operation obtains for the servo loop constituted by the transducer armature 53, the demodulator-amplifier 91, and the servomotor 95.

If the angular positions of the transducer armatures 52 and 53 are identical, this indicates that their relative lengthwise positions along the associated stators 50a and 51a, within the unit distance of the groove pitch, are identical. On the other hand, if the angular positions of the armatures 52 and 53 are not in agreement after they have been brought to null positions by the servomotors 94 and 95, it is indicative that the armatures are not positioned identically in a lengthwise direction relative to their respective stators.

To detect and compare the angular positions of the armatures 52 and 53, two phase-sensitive synchro devices are employed. As here shown, a synchro transmitter 110 has its rotor and rotor winding 110a drivingly connected to the gear 102, so that the rotor and winding 110a always agree in angular position with the transducer armature 53. A synchro receiver 111 has its rotor and rotor winding 111a directly connected to the gear 99 so that such rotor winding will always agree in angular position with the transducer armature 52. The two rotor windings 110a and 111a are normally angularly displaced relative to one another by 90° when the armatures 52 and 53 are in angular agreement.

The transmitter rotor winding 110a is continuously excited from the A.C. reference source 82 over the conductors 96, while the three-phase stator windings 110b and 111b of the transmitter 110 and receiver 111 are connected directly together as shown in FIG. 7. As is well known, this connection of synchro devices will result in an A.C. signal induced in the receiver rotor winding 111a which is of substantially constant amplitude, but which is shifted in phase from the reference A.C. signal supplied to the transmitter rotor winding 110a by an angle proportional to the angular mismatch of the two rotors. If the two rotor windings 110a and 111a are normally angularly displaced by 90° relative to one another, then the signal induced in the receiver winding 111a will be 90° out of phase with the excitation signal supplied to the transmitter winding 110a. However, as the physical angle between rotor windings 110a and 111a is increased or decreased above or below 90°, then the A.C. signal induced in the receiver winding 111a will correspondingly shift in phase, relative to the reference signal, through corresponding angles and directions.

Because the synchro rotor windings 110a and 111a are physically driven to angular positions corresponding to the angular positions of the transducer armatures 53 and 52, respectively, and because the angular positions of those transducer armatures correspond to their relative longitudinal positions along their corresponding transducer stators 50a and 51a, the phase angle of the A.C. output voltage induced in the receiver winding 111a will vary with the longitudinal mismatch of the two transducer armatures relative to their respective stators.

The phase-variable signal induced in the receiver rotor winding 111a is supplied to the primary winding 114a of a transformer 114, forming a first input to a phase discriminator or comparator circuit 118. The reference A.C. voltage from the source 82 is supplied to the primary winding 120a of a transformer 120, forming the second input to the phase comparator. This phase comparator is per se familiar to those skilled in the art, and its operation need not be described in detail. It is sufficient to note that due to a vector combination of the first and second signals in the secondary windings 114b, 114c, and 120b, to rectification by diodes 121 and 121a, and to algebraic summation across the resistors 122 and 123, the average direct current voltage appearing across the output terminals 124a, 124b is of a polarity and magnitude corresponding to the cosine of the phase angle between the two A.C. input voltages supplied to the primary windings 114a and 120a.

When the transducer armatures 52 and 53 are in angular agreement, the synchro rotor windings 110a, 111a will be relatively displaced by 90°, and the voltage applied to the primary winding 114a will be displaced 90° in phase relative to the reference voltage applied to the primary winding 120a. Thus the average D.C. voltage across the output terminals 124a, 124b will be zero. This indicates that the two armatures 52 and 53 carried by the end portions 26a, 26b of the rail 26 are positioned identically in a lengthwise direction relative to their stationary stators 50a and 51a.

However, if the two transducer armatures 52 and 53 should be relatively displaced by positive or negative angles, as the servomotors 94 and 95 keep them in null positions, the physical angle between the synchro rotor windings 110a, 111a will increase or decrease proportionally, so that the phase angle between the two A.C. voltages supplied to the phase comparator 118 will increase or decrease from a 90° value. Thus, the average D.C. voltage across the output terminals 124a, 124b, will correspondingly increase from zero with a positive or negative polarity.

To indicate the posture of the rail 26, a dual polarity direct current meter 125 is connected to the output terminals 124a, 124b. When the meter 125 displays a zero reading, it indicates that the rail 26 is level relative to the two transducer stators. But if the meter 125 displays a positive or negative reading, it indicates that the left end portion 26a of the rail is higher or lower, respectively, than the right end portion of the rail relative to the two transducer stators. The meter 125 may be directly calibrated in thousandths of an inch to indicate just how much the left end of the rail is "high" or "low" relative to the right end.

The reading of the meter 125 indicates the relative longitudinal positions of the transducer armatures 52 and 53 along the respective transducer stators 50a and 51a. In order for the meter reading to reflect accurately the difference in the distances of the two rail end portions 26a, 26b from the datum plane or table surface 14a, it is necessary initially to space the transducer stators 50a, and 51a equally from that datum plane, and to make the angular positions of such stators (about their longitudinal axes) agree, so that the angular positions of the armatures 52 and 53 will exactly correspond when they are at null locations with the rail 25 perfectly parallel to the table surface 14a.

To accomplish such initial adjustment, the locking nuts 70 and 71 (FIG. 5) associated with each of the stators, are first loosened, and gauge blocks 130 of uniform, precise thickness are bolted to the table surface 14a to extend beneath the lower ends of the adjustment plunger 66. One such gauge block is illustrated in FIG. 4.

The rail 26 is then made accurately parallel with the table surface 14a through the use of an elongated gauging rod (not shown) which is successively inserted between the table surface 14a and the lower surface of the rail at several points along the latter. If the rail is not precisely level, it is correctively adjusted at this time by means which will be described below. With the rail so leveled, and with the transducer stators equally spaced above the table surface 14a by the gauge blocks 130, the meter 125 may not display a zero reading because the transducer stators 50a, 51a and the associated armatures 52, 53 are angularly displaced relative to one another. To eliminate such angular displacement, a wrench or other suitable tool is engaged with flats 131 formed on the lower end of one of the adjustment plungers 66, and the latter is rotated to angularly adjust the associated transducer stator until the meter 125 displays a zero reading. Since the servomotors 94 and 95 serve always to keep the transducer armatures 52 and 53 angularly positioned at null points, rotation of one of the transducer stators 50a or 51a will cause the corresponding armature 52 or 53 to move angularly until the signal induced in the receiver rotor winding 111a has a 90° phase angle relative to the reference A.C. signal, and the reading of the meter 125 is zero.

After this initial adjustment, it is known that when the rail 26 is perfectly parallel with the datum plane or table surface 14a, the reading of the meter 125 will be zero.

As a final part of the present system, means are provided to actuate one of the rail elevating means in order to raise or lower one end of the rail relative to the other, and thus to bring the rail into parallelism, if the meter 125 should indicate that it is tilted.

For this purpose, the nut 36 is journaled in the rail 26, and is associated with means to rotate the same while the associated screw 34 remains stationary. As shown in FIG. 2, the nut 36 is formed in two parts 36a and 36b which are rigidly connected together by locking screws 136, the part 36b being adjusted within the part 36a by an inserted shim 138 in order to substantially reduce or eliminate backlash freedom. The two parts 36a and 36b may be considered as a single piece, however, and the entire nut 36 is journaled for rotation within the rail 26 by bearings 139, 140 and 141.

To drivingly rotate the nut 36, a worm wheel 144 is rigidly fixed thereto and cooperatively engaged by a worm gear 145. As shown in FIG. 1, an adjusting motor 146 is drivingly connected to the worm gear 145 through a speed-reducing worm gear 148 and a mating worm wheel 149. When the screw 34 is stationary and the motor 146 is energized to run in one direction or the other, the nut 36 will be rotationally driven in one direction or the other, so that the left end portion 26a will be raised or lowered relative to the column 31 and the table 14. Yet, because the worm gear connections 144, 145 and 148, 149 are irreversible, the nut 36 is held rigidly against rotation relative to the rail except when the motor 146 is energized. Thus, when the screw 34 is rotated by drive from the elevating motor 40, the left end portion 26a of the rail will be raised or lowered in unison with the right end portion 26b.

The motor 146 may, for example, be of the three-phase, reversible type. As shown in FIG. 1, the motor 146 is energized from a three-phase voltage source to rotate the nut 36 in a direction to raise the left end portion 26a of the rail in response to closure of contacts 150a and 150b controlled by a contactor coil 150 which is energized when a normally open "raise" pushbutton switch 151 is actuated. Alternatively, the motor 146 is energized to rotate the nut 36 in a direction to lower the left end portion 26a of the column when contacts 152a and 152b are closed in response to the energization of an associated contactor coil 152 by actuation of a normally open pushbutton "lower" switch 153. Thus, if the operator observes that the meter 125 indicates that the rail 26 is not in parallelism with the table surface 14a, he may momentarily actuate the pushbutton switches 151 or 153 to jog the motor 146 until the left end of the rail 26 is raised or lowered sufficiently to make the meter 125 have a zero reading It will be recalled that the servomotors 94 and 95 always rotate the transducer armatures 52 and 53 in a direction and by an amount to bring such armatures to the nearest angular position in which the signals induced in the secondary coils are reduced to zero. If the pitch of the grooves in the transducer stators and armatures has a value on the order of 0.20 inch, one such null point will be sensed by the armatures 52 and 53 at intervals spaced by distances of 0.2 inch along the corresponding stators. It is necessary, therefore, to prevent the transducer armature 52 from "zeroing in" on a null position which is spaced along the stator 50a by one or more pitch distances from the null position occupied by the transducer armature 53 relative to the stator 51a. Without such prevention, it is conceivable that an operator could energize the motor 146 for such long periods that the system would indicate the rail 26 to be level when, in fact, the left end of the rail might be one or more pitch distances above or below the right end of the rail.

To safeguard against this possibility, means are provided to limit the range of angular movement of the nut 36. For this purpose, mechanical stops are associated with the nut 36. As illustrated in FIG. 3, two adjustable stop screws 160 and 161 are inserted through the rail 26 to straddle a stop projection 162 fixed to the outer surface of the nut 36. The stop screws 160, 161 may be adjusted to limit the angular freedom of the nut 36 to an angle on the order of 10 to 25 degrees, thus limiting the vertical travel of the end portion 26a by rotation of a nut 36 to a range on the order of 0.002 to 0.10 inch. This assures that the motor 146 cannot drive the nut 36 through such an angle that the transducer armature 52 "zeros in" on a null position which is displaced on either side of the proper null position corresponding to that sensed by the transducer armature 53.

To mechanically limit the rotation of the motor 146, however, might result in its drawing excessive currents. This is precluded in the present instance by means to automatically deenergize the motor whenever the nut 36 has been rotated to one of the mechanical limit positions defined by the stop screws 160 or 161. As shown in FIG. 1, a shaft 145a is extended from the nut 145 and formed with a threaded screw portion 145b. A nut 145c is threadably engaged with the screw portion 145b, and restrained against rotation while permitted to have freedom for longitudinal movement lengthwise of the screw portion. The nut carries a collar 145d which will engage and deflect movable arms 166a of normally closed switches 165 and 166 having stationary contacts 165b and 166b. It will be seen from FIG. 1 that the contactor coil 150 is connected across two of the three-phase voltage lines through the "raise" switch 151 and through the normally closed safety switch 165. In like manner, the contactor coil 152 is connected across two of the three-phase voltage supply lines through the "lower" pushbutton switch 153 and the normally closed safety switch 166.

If the "raise" or "lower" switches 151 or 153 are held depressed by the operator for so long that the nut 36 is driven to one of the mechanical limit positions defined by the stop screws 160 or 161 (FIG. 3), then the nut 145c will be driven to the right or the left along the screw 145b until the collar 145d deflects the movable contact members 165a or 166a, thereby opening the switch 165 or 166 and deenergizing the contactor coils 150 or 152. This assures that the motor 146 will not remain energized if the nut 36 is driven to one of its two limit positions and the corresponding pushbutton switch held closed.

*Synopsis of Operation*

After the initial adjustments described above have been completed, the meter 125 will have a zero or null reading, with the rail 26 being perfectly parallel to the table surface 14a.

The rail 26 and the headstock 22 thereon may be raised or lowered by synchronous rotation of the two lead screws 34 and 35 by drive from the motor 40 through the gear box 41 and gears 44, 46 and 45, 47. Because the elevating screws 34, 35 and their mating nuts 36, 37 are of precision construction, the two end portions of the rail 26 should, as a theoretical matter, always move in unison, and the rail should always remain level, i.e., parallel to the table surface 14a.

As a practical matter, however, the two end portions 26a and 26b will not remain equally spaced above the table surface 14a. Due to thermal distortion, unequal loading when the head stock 22 is located near one end of the rail, wear on the elevating screws, or other spurious influences, the rail will become somewhat tilted or skewed relative to the table surface 14a. In very large milling machines it has been found that even though the elevating screws and nuts are of the highest precision construction, the distances from opposite end portions of the rail to the table surface 14a may disagree by as much as .005 to .010 inch. This does not seem to be a serious discrepancy. However, as the headstock 22 is moved back and forth along the entire length of the rail, such discrepancy can result in an objectionable slant of the upper surface 18a machined on the workpiece 18.

As the rail 26 is moved up and down, the two transducer armatures 52 and 53 will move correspondingly lengthwise along their respective stators 50a and 57a. Because the servo loops including the demodulator-amplifiers 90 and 91, and the servo motors 94 and 95 (FIG. 7) always operate to keep the armatures 52 and 53 rotationally positioned such that there is a minimum or zero induced signal in the secondary coils 57 and 58, the armatures 52 and 53 will be rotationally driven as the rail is moved vertically up and down. This rotation of the armatures will amount to one revolution for each pitch length that the rail moves relative to the stators.

If the opposite end portions 26a and 26b of the rail 26 always move through equal distances, i.e., if the rail 26 remains parallel to the surface 14a, then the two transducer armatures 52 and 53 will always be rotated through equal angles. Accordingly, the synchro transmitter and receiver rotor windings 110a and 111a will remain physically separated by 90° in their angular positions, and the output signal supplied from the receiver winding 111a to the input winding 114a of the phase comparator 118 will remain displaced 90° in phase from the reference signal supplied to the primary winding 120a. Thus, the average D.C. voltage appearing between the terminals 124a and 124b will be zero, and the D.C. meter 125 will display a zero reading.

However, when tilting or skewing of the rail 26 occurs for any reason, then one of the transducer armatures 52 or 53 will longitudinally move relative to its stator through a distance which is greater or less than the corresponding movement between the other armature and stator. The servo motors 94 and 95 will drive the armatures 52 and 53 to rotational null positions, but one of the armatures will, under these circumstances, be angularly displaced relative to the other. Accordingly, the synchro transmitter and receiver windings 110a and 111a will be relatively displaced by an angle greater or less than 90°, and the phase of the output signal from the receiver rotor winding 111a will change in a positive or negative sense from the original 90° angle relative to the reference A.C. signal supplied to the comparator input winding 120a. Accordingly, the average or D.C. value of the voltage appearing between the terminals 124a and 124b will increase in a positive or negative sense, depending upon whether the left end portion 26a of the rail is slightly higher or slightly lower than the right end portion 26b. The magnitude of this voltage will be a function of the difference in distance of the two rail end portions from the datum plane or table surface 14a.

Thus, any time after the rail 26 has been moved from one vertical position to another, the machine operator may glance at the meter 125. If it displays a zero reading, the operator knows that the rail has remained perfectly parallel to the table surface. On the other hand, if the meter 125 displays a positive or negative reading, the operator knows that the left end portion 26a of the rail 26 is higher or lower than the right end portion 26b. With the dial of the meter 125 appropriately calibrated, the operator can read directly in thousandths of an inch the magnitude of the discrepancy.

If the meter gives a "high" or "low" indication, the operator need only jog the "lower" or "raise" pushbutton switch 153 or 151, thereby energizing the motor 146 and causing the latter to rotate the nut 36 so that the left end portion 26b of the rail is lowered or raised. Rotation of the nut 36 relative to the screws 34 will result in vertical movement of only the left end portion 26a of the rail 26. And as this movement occurs, the transducer armature 52 will be moved longitudinally relative to its stator 50a, and the servomotor 94 will be energized to angularly displace the armature 52 until the latter resides at a null position. This will reposition the receiver rotor 111a by drive from the gear 99, and will correctively change the phase angle of the output signal induced in the rotor winding 111a. Therefore, as the operator brings the rail 26 to a position of substantially perfect parallelism with the table surface 14a, the reading of the meter 125 will return to zero. With this, the operator can be assured that the rail is perfectly parallel to the table surface and that the machine is ready for precise machining operations.

I claim as my invention:

1. In a machine tool having an elongated rail disposed above a work support having a substantially horizontal surface, two lead screws, two nuts carried by opposite end portions of said rail and engaged with respective ones of said screws, and means for rotating said lead screws in unison to bodily raise and lower said rail relative to said support through a distance range which is relatively great compared to a predetermined unit distance, the combination comprising an electrical position transducer associated with each end portion of said rail, means for exciting each transducer, means included in each transducer for producing an electrical signal which varies cyclically as the corresponding end portion of said rail moves through successive unit distances from said horizontal surface, and means responsive to the electrical signals from said two transducers for signalling when the distances from said horizontal surface to the opposite end portions of said rail are unequal.

2. In a machine tool having a substantially horizontal rail, two vertical lead screws, two nuts carried by opposite end portions of said rail and engaged with respective ones of said screws, and means for synchronously rotating said screws to bodily raise or lower said rail, a system for maintaining said rail precisely parallel to a horizontal datum plane comprising, in combination, two transducers each having one stationary part and one movable part, the movable parts being rotatably mounted on opposite end portions of said rail, each of said transducers having means for producing an electrical signal which varies cyclically as the movable part passes through successive unit distances along said stationary part or as the movable part rotates through successive revolutions relative to the stationary part, means for adjusting said stationary parts when the rail is parallel to said datum plane to make the signals of said transducers correspond, servo means for maintaining said movable parts rotatably positioned such that said electrical signals are at null values, and means for comparing the angular positions of said movable parts and signalling lack of correspondence therebetween.

3. In a machine tool having a substantially horizontal rail, two vertical lead screws, two nuts carried by opposite end portions of said rail and engaged with respective ones of said screws, and means for synchronously rotating said screws to bodily raise or lower said rail, a system for maintaining said rail precisely parallel to a horizontal datum plane comprising, in combination, two transducers each having a stationary, vertical rod and a cylinder surrounding and longitudinally and rotationally movable relative to the rod, said cylinders being rotatably mounted on opposite end portions of said rail to move along said rods as the rail moves vertically, each of said transducers having means for producing an electrical signal which varies cyclically as the cylinder thereof passes through successive unit distances along said rod or rotates through successive revolutions relative to said rod, servo means for rotatably driving said cylinders to angular positions at which said transducer signals have null values, means for adjusting said rods when the rail is parallel to said datum plane to make the angular positions of said cylinders correspond, and means for comparing the angular positions of said cylinders and signalling the sense and magnitude of any lack of correspondence between such angular positions.

4. In a machine tool having spaced columns on either side of a work support having a horizontal surface, a rail with its opposite end portions slidable along respective ones of said columns, a lead screw disposed adjacent each said column, a nut carried by each end portion of said rail and engaged with one of said screws, and means for causing relative rotation of each nut and screw in unison to raise and lower said rail over a range which is relatively great compared to a predetermined unit distance, a system for maintaining said rail in parallelism with said support surface comprising, in combination, two transducers each having a first part carried by one of said columns and a second part carried by one end portion of said rail and movable vertically relative to the first part, means for electrically exciting one part of each transducer, each transducer including means for creating in the second part an electrical signal which varies cyclically with the relative positions of the two parts as they are moved relatively through successive unit distances, means for comparing the electrical signals in said second parts, and means for signalling mismatch of said signals indicative that the elevations of the rail end portions above the support surface are unequal.

5. For use with an elongated member disposed above a datum plane, elevator means disposed adjacent each end of the elongated member for raising and lowering the same relative to the datum plane over a relatively great distance compared to a predetermined unit distance, said great distance being at least a multiple of said unit distance, and means for normally actuating the elevator means in unison, the combination comprising an independent transducer means adjacent each end of the elongated member for respectively producing signals which vary cyclically in response to the respective ends of said member being moved through successive unit distances from the datum plane, and means for comparing said signals and signalling lack of correspondence indicative that said member is not parallel to said datum plane.

6. For use with an elongated member disposed above a substantially horizontal datum plane, elevator means operative on each end thereof, and means for normally actuating the elevator means in unison to raise and lower said member relative to the datum plane through distances which are relatively great compared to a predetermined unit distance, said great distance being at least a multiple of said unit distance, a system for maintaining said elongated member in parallelism with the datum plane despite thermal distortions, unequal loading and wear of parts, said system comprising, in combination, an independent transducer means adjacent each end of the elongated member for respectively producing signals which vary cyclically in response to the respective end portions of said member being moved through successive unit distances from the datum plane, and means for comparing said signals and signalling the sense and magnitude of disagreement between such signals which are thereby indicative of the direction and extent of the difference in the distance of said end portions from said datum plane.

References Cited in the file of this patent

UNITED STATES PATENTS

| | | |
|---|---|---|
| 2,332,289 | Zeitlin | Oct. 19, 1943 |
| 2,600,550 | Levesque | June 17, 1952 |
| 2,631,027 | Payne | Mar. 10, 1953 |
| 2,684,001 | Wilson | July 20, 1954 |
| 2,866,946 | Tripp | Dec. 30, 1958 |
| 2,880,407 | Comstock | Mar. 31, 1959 |
| 2,901,947 | Wanninger et al. | Sept. 1, 1959 |